Figure 1:
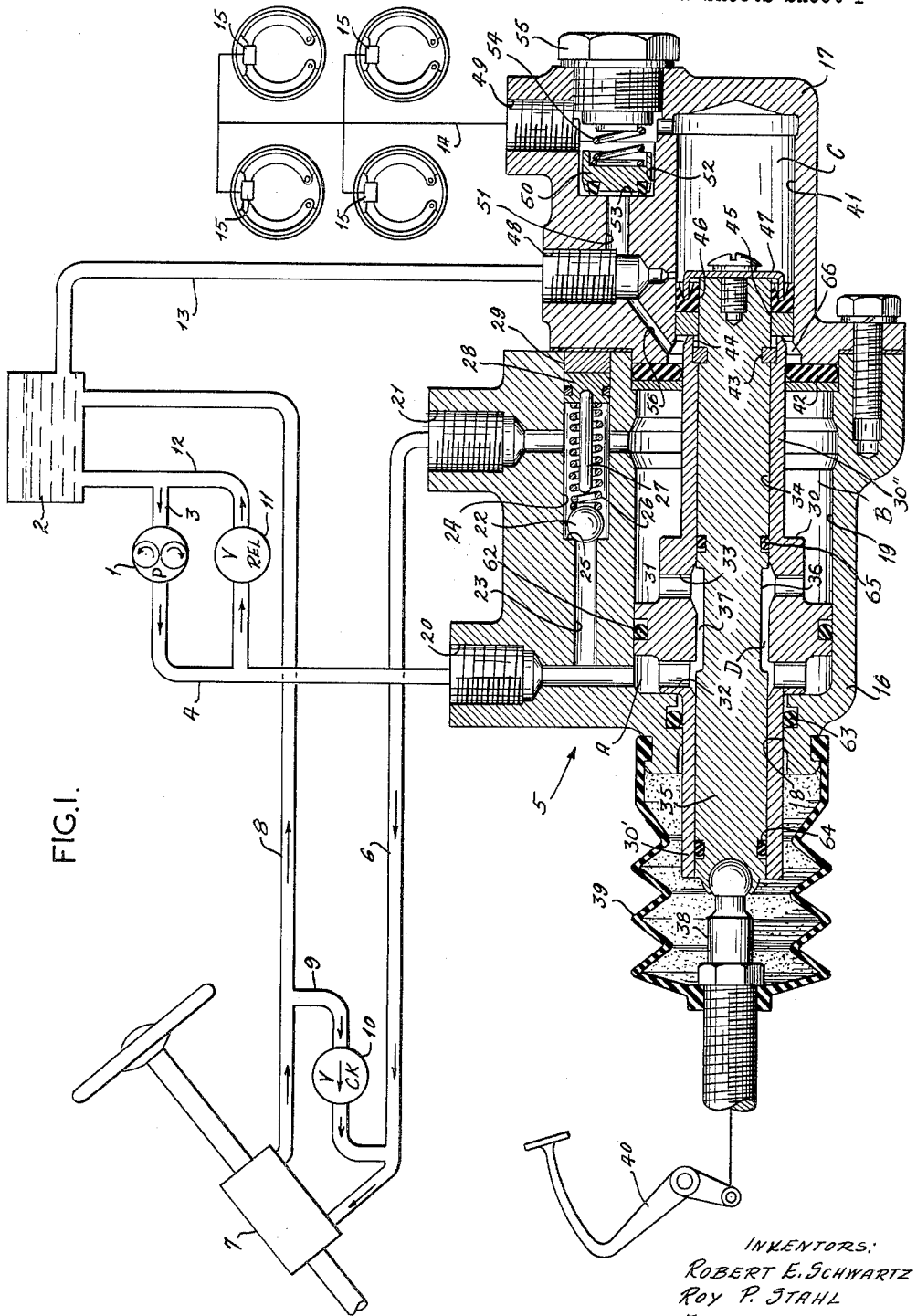

INVENTORS:
ROBERT E. SCHWARTZ
ROY P. STAHL
EDWARD J. FALK
By Gravely, Lieder, Woodruff & Wills
ATTORNEYS.

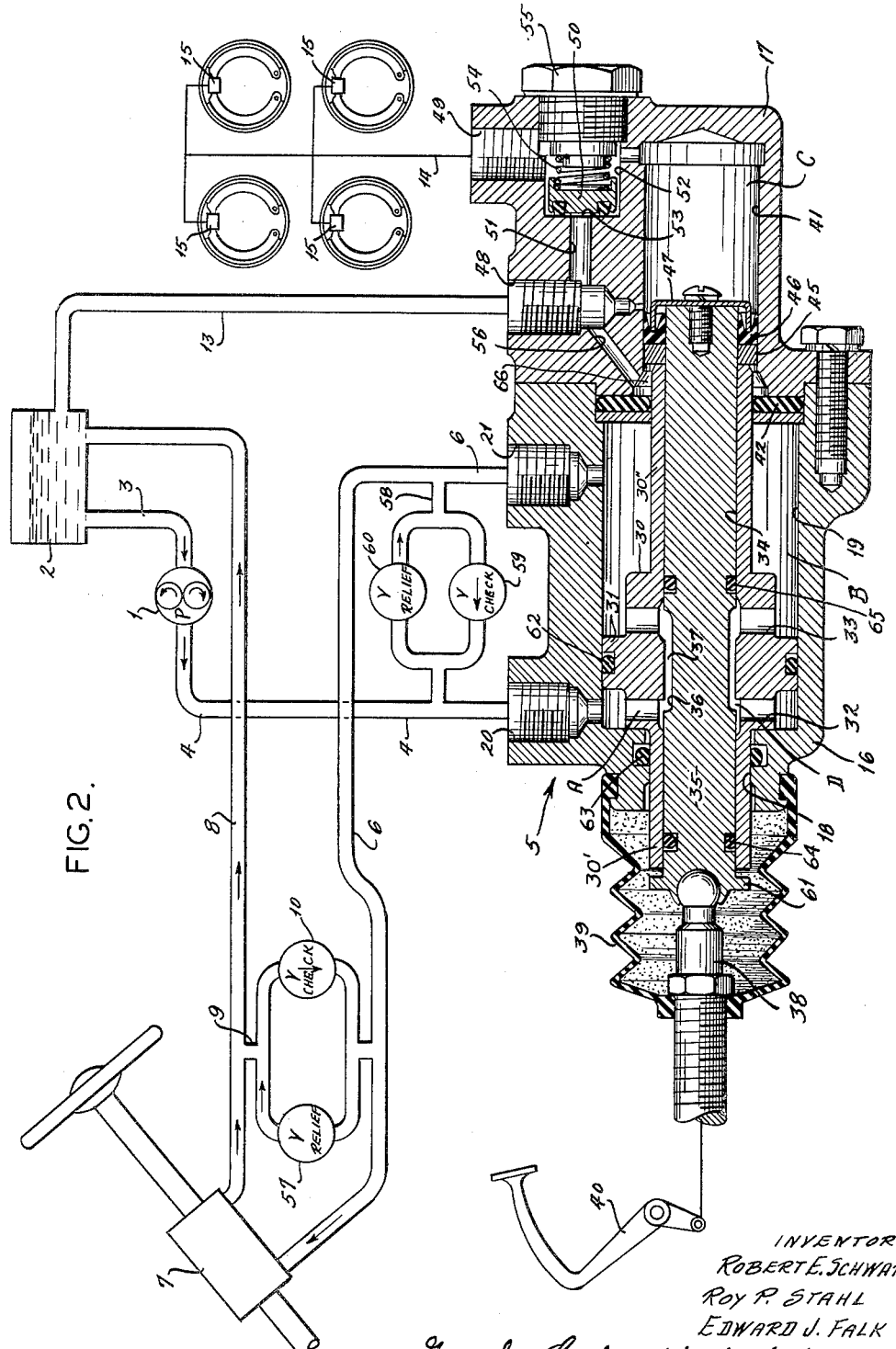

United States Patent Office 3,050,944
Patented Aug. 28, 1962

3,050,944
POWER HYDRAULIC BRAKE DEVICE
Robert E. Schwartz, Clayton, Mo., Roy P. Stahl, South Bend, Ind., and Edward J. Falk, St. Louis, Mo., assignors to Wagner Electric Corporation, St. Louis, Mo., a corporation of Delaware
Continuation of abandoned application Ser. No. 496,711, Mar. 28, 1955. This application Nov. 22, 1960, Ser. No. 71,102
13 Claims. (Cl. 60—54.6)

This invention relates to series power hydraulic braking systems and in particular to a servo motor employed therein to control said system.

One of the principal objects of the present invention is to provide a servo motor which is balanced to function regardless of the existing ambient pressure in its particular section of the system.

Another object of this invention is to provide a servo motor which operates the vehicle brake assemblies even if there is a power failure in the system.

Still another object of the present invention is to provide a servo motor having a free and slidably mounted power piston which does not displace pressure fluid during a braking operation after there has been a power failure and which thereby reduces the manually applied force normally required under such conditions.

Still another object of the present invention is to provide a servo motor which provides "feel" for the operator. "Feel" is the proportional reactionary force in opposition to the applied force which affords the operator an appraisal as to the extent of the braking application.

Another object of the present invention is to provide a servo motor which appreciably reduces the port hole cutting of the sealing cup used therein.

These and other objects and advantages will become apparent hereinafter. The present invention comprises a plurality of servo motors serially arranged with a positive displacement pressure producing means in a hydraulic system. The servo motors are manually operated thereby restricting the pressure fluid flow therethrough to establish a pressure differential. This pressure differential supplements the operator applied force and acts as a booster force to actuate the vehicle brakes, power steering, and the like. The servo motor described hereinafter provides safe operation of the brake assemblies before, during and after a power failure; however, in the event of failure, the operator must supply all of the force required.

The invention also consists in the parts and in the arrangements and combinations of parts hereinafter described and claimed. In the accompanying drawings which form part of this specification and herein like numerals and symbols refer to like parts wherever they occur:

FIG. 1 illustrates a braking system having a preferred embodiment of this invention therein shown partially in cross-section, and FIG. 2 shows a modification of the preferred embodiment partially in cross-section in a braking system.

This is a continuation of co-pending application, Serial No. 496,711, filed March 28, 1955, now abandoned, for Power Hydraulic Brake Device.

As used herein, the term "open center" refers to a system defined as having a continuous pressure fluid flow or circulation therein and a dormant state characterized by a relatively small fluid pressure potential. The term "open center"' shall also refer to a valve or servo motor for controlling or functioning in such a system, and adapted to throttle or restrict the flow of pressure fluid therethrough to generate fluid pressures in the system on the inlet side of the valve without appreciably diminishing the volumetric rate of pressure fluid flow through the system on both sides of the valve.

The term "ambient" as used in reference to fluid pressures in an open center system or servo motor shall mean the pressure of fluid in the system across a servo motor imposed by a force or means of the system external to the servo motor at any given instant.

Referring to FIG. 1, the power hydraulic system shown comprises a positive displacement pumping means 1 supplied by a fluid reservoir 2 through a conduit 3. The pressure side of the pumping means 1 is connected by a conduit 4 to an inlet and an inlet chamber A in a servo motor 5. A conduit 6 connects the outlet side of the motor 5 with a power hydraulic steering valve 7 arranged in series with said motor. The outlet of said steering valve 7 is connected with the reservoir 2 by a conduit 8 thus providing a return passage for the fluid displaced by the pumping means 1.

In addition to the above circuit, a conduit 9 is provided connecting the conduits 6 and 8 and having a reverse flow valve 10 interposed therein, said reverse flow valve being employed to facilitate pressure fluid recirculation during a power steering failure application. If desired, the valve 10 may be integral with the power steering valve 7. A pressure relief valve 11 is interposed in a conduit 12 which connects the conduits 3 and 4 and provides a shunt or by-pass around the pumping means 1 thereby protecting said means from pressure overloads. Also a conduit 13 is connected between the reservoir 2 and a fluid port in the servo motor 5 for compensation purposes. A conduit 14 is attached to the pressure side of the servo motor 5 and leads to a plurality of wheel cylinders 15 which actuate the brake assemblies.

The servo motor 5 comprises a booster housing 16 having a brake housing 17 secured to the right end thereof. The booster housing 16 has a piston bore 18 and a counterbore 19 horizontally arranged therein. The counterbore 19 is provided with a vertically positioned inlet 20 at its left end and an outlet 21 near the right end thereof. A ball type pressure relief valve 22 is interposed between inlet 20 and outlet 21 being received in the connecting passage formed by a horizontal bore 23 and axially aligned counterbore 24, the valve 22 being biased against a seat 25 by a valve spring 26 carried by a guide member 27. The right end of the spring 26 abuts against a sealing member 28 and has its compressive force predetermined by a spacer 29 against which the right side of the sealing member 28 is seated.

A power piston 30 is freely and slidably mounted in the bore 18 and counterbore 19 and is provided with an enlarged portion 31 substantially at the mid-portion thereof carrying an O ring 62 to provide a seal between the wall of the counterbore 19 and the outer periphery of said enlarged portion. Thus, the enlarged portion 31 of the power piston 30 forms an inlet chamber A in the counterbore leftwardly thereof and a main chamber B rightwardly thereof. Another O ring 63, supported in a groove in the bore 18 seals a leftward extension 30' of the piston 30. Cross-drilled passageways 32 and 33 are positioned on opposite sides of the enlarged portion 31 and intersect a bore 34 within the piston 30. Slidably received in the bore 34 is a throttling rod 35 have a circumferential groove 36 in its mid-portion forming a throttling passage D and a channel 37 between said rod 35 and bore 34. An O ring 64 is supported in the left end of the rod 36 to provide a seal between the bore 34 of the power piston 30 and the rod 35, and another O ring 65 is supported in said rod 35 rightwardly of the groove 37 to provide a seal between the bore 34 and the rod 35. The leftward end of the throttling rod 35 pivotally receives one end of a push rod 38. A resilient boot 39 houses the leftward ends of the power piston 30 and rod 34 outwardly of the seals 63 and 64, and the boot 39 prevents the entry of foreign matter into the servo motor 5 and is positioned between the left end of the servo motor 5 and the push rod 38. The leftward end of said push rod 38 is attached to a brake actuating pedal 40 through a mechanical linkage (not shown). The actuating pedal 40 is provided with a return spring (not shown) which exerts a positive, but negligible, return or leftward force on the push rod 38 and throttling rod 35.

The free and slidable power piston 30 has a rightward projection or extension 30" of the same diameter as the leftward extension 30', the projection extending coaxially into a working or outlet bore 41 provided in the brake or master cylinder housing 17 through a sealing ring 42 retained in the right end of the counterbore 19 by suitable means. The bore 34 extends through the projection 30" and the right end of the throttling rod 35 also projects into the bore 41 extending beyond the piston projection 30" and carrying a snap ring 43 which is seated in a recess 44 adjacent to the right end portion of the power piston extension 30". The throttling rod 35 also carries a cup back-up washer 45 and a double-lipped, resilient, sealing cup 46 which are positioned thereon by retaining means 47 secured to the rod 35. Since the rod 35 is urged leftwardly by the actuating pedal return spring (not shown), the retainer 47, the cup 46, the washer 45, and the right end or edge of the piston extension 30" are normally biased into an abutting relationship.

A reservoir port 48 is vertically positioned in the upper portion of the brake housing 17 for compensation purposes. One end of the reservoir port 48 receives the conduit 13 and the other end intersects the bore 41 adjacent to the lip of the cup 46 as shown. An outlet or pressure producing chamber C is formed in the bore 41 rightwardly of the cup 46 and is provided with an outlet port or brake port 49 which connects the rightward end of the bore 41 with the conduit 14. A compensation valve 50 is positioned between the reservoir port 48 and the brake port 49 and is mounted in a connecting passageway formed by a horizontal bore 51 and an axially aligned counterbore 52. The valve 50 is biased against a seat 53 by a spring 54 positioned between said valve 50 and an end plug 55 fixedly mounted in the counterbore 52. Another passageway 56 is angularly interposed between the reservoir port 48 and the bore 41 intermediate the seals 42 and 46 and functions as a fluid supply port and lubrication means to connect the reservoir 2 with an annular groove 66 in communication with the rightward end of the power piston extension 30". It is apparent that the pressure fluid in the outlet chamber C and in the groove 66 is atmospheric in the normally inoperative position of the servo motor 5.

In this series flow system, the pressure relief valve 11 operates at a pressure equal to the sum of the maximum pressure differentials allowed across the individual servo motors and protects the pumping means 1 from pressure overloading which is caused when one or more of the servo motors exceed the predetermined maximum pressure differential. Each servo motor is provided with a pressure relief valve which predetermines the maximum pressure differential allowed thereacross, and the fluid pressure developed by or existing in a servo motor at any time is effective upon every servo motor of prior position in the system. If the steering valve 7 is actuated, the pressure differential created therein causes a back pressure which establishes the ambient fluid pressure in the servo motor 5 and against which the pumping means 1 must work. In the past a servo motor of prior position would be actuated by this back pressure but, according to the present invention, the servo motor 5 is balanced to prevent such an occurrence.

Balacing is achieved by a symmetry of cross-sectional areas which are acted on by the ambient pressures in the system including the back pressure of the pressure fluid produced by means external of servo motor 5 such as the valve 7. In the free and slidable piston 30, the effective cross-sectional area of the leftward portion of the enlarged portion 31 in the inlet chamber A is equal to the cross-sectional area of the rightward portion which forms part of the main chamber B. This balancing may also be seen as the substantially radial areas of the piston between the sealing ring 62 and each of the sealing rings 63 and 42, or as the areas of the piston 30 on which pressure fluid acts in the chambers A and B between the seal 62 and the seals 63 and 42 sealing the extensions 30' and 30" having equal diameters. In the throttling rod 35, the affected cross-sectional area forming the leftward wall of the groove 36 is balanced by an equal affected area forming the rightward wall thereof or the areas of the rod 35 between the sealing rings 64 and 65. It is also apparent that the effective areas of the rod 35 and piston extensions 30' and 30" outwardly of the seals 63, 64, 65 and 42 are acted on by atmospheric pressure and are substantially equal whereby these forces are self-cancelling. In this manner, equal and opposite self-cancelling forces are produced on the piston 30 and rod 35 obviating the effect of any back pressure imposed throughout the servo motor 5 in that particular section of the series flow system.

Assuming the steering valve 7 to be unrestricted, pressure fluid is normally discharged from the pumping means 1 through the conduit 4 and the inlet 20 into the inlet chamber A of the servo motor 5 where it flows through passageway 32 unrestricted into the throttling passage D and through the passageway 33 and therefrom into the counterbore 19 or chamber B. From the counterbore 19, the fluid flows through the outlet 21 and the conduit 6 into the power steering valve 7 and is then returned to the reservoir 2 through the conduit 8.

When the vehicle operator applies a force to the actuating pedal 40, a proportional force is transmitted to the push rod 38 and the throttling rod 35 through the intermediate linkage (not shown). Therefore, the throttling rod 35 is moved rightwardly restricting pressure fluid flow through the throttling passage D or the channel 37 thereby creating a pressure differential across the enlarged portion 31 of the free and slidable piston 30. Because of this pressure differential, the power piston 30 moves rightwardly carrying the washer 45 and cup 46 further into the pressure producing chamber C of the bore 41, and the throttling rod 35 necessarily follows and maintains the restriction of the throttling passage D and the restriction of fluid through the channel 37 because of the manually applied force. This movement displaces pressure fluid from the bore 41 or outlet chamber C to the brake port 49 and the conduit 14 into the wheel cylinders 15 thereby actuating the brake assemblies. The magnitude of the maximum pressure differential is predetermined by the operating or actuating pressure of the pressure relief valve 22. The fluid pressure developed in the outlet chamber C acts on the effective areas of the washer 45 and the cup 46 and also the rod 35 creating a reactionary force in opposition to the motivating force of the piston 30 and the rod 35. When the reactionary force equals the motivating force, the rightward movement of said piston 30 and rod 35 ceases. Since the reactionary force thus created is effective upon the rod 35, the operator is afforded a direct "feel" as to the extent of the braking application.

When the operator releases the applied force, the established fluid pressure in the bore 41 and the actuating pedal return spring returns the throttling rod 35, the free and slidable piston 30, and parts associated therewith to their normal positions. When this occurs, a partial vacuum is developed in the bore 41. The compressive force of the spring 54 in association with the compensation valve 50 is very light allowing the valve to be actuated at a very small pressure differential existing between the bore 51 and the bore 41. Thus, pressure fluid is allowed to flow past the valve 50 at a small pressure differential to compensate for pressure fluid losses in the bore 41.

Since fluid compensation into chamber C is not accomplished by collapsing the lip of sealing cup 46, said sealing cup may be provided with a shorter and stiffer lip portion so that it will be exposed to port hole cutting for a shorter distance and be more resistant to port hole cutting during said shorter distance.

In the event of a power failure, the operator is required to supply all of the actuating force to operate the servo motor 5. As previously described, the force applied by the operator moves the throttling rod 35 rightwardly. Due to the absence of pressure fluid flow through the throttling passage D, a pressure differential is not created to motivate the free and slidable piston 30 and actuation of the pressure producing or working parts in the outlet chamber C occurs by manual movement of the throttling rod 35 only. The immobility of the piston 30 obviates the need for a reverse flow valve between chambers A and B of the servo motor 5 since displacement of pressure fluid from chamber B does not occur and seal friction is not created. Therefore, the manually applied force normally required for a braking application after a power failure is reduced. Consequently, the throttling rod 35 carries the snap ring 43, the washer 45, and cup 46 into the bore 41 displacing pressure fluid from the outlet chamber C to the brake port 49 and the conduit 14 into the wheel cylinders 15 which actuate the brake assemblies. In this case, the force in opposition to the force of the pressure fluid in the bore 41 acting upon the effective areas of the cup 46 and the rod 35 is supplied totally by the operator. Upon release of said applied force, the fluid pressure in the bore 41 and the actuating pedal spring returns the throttling rod 35 and parts associated therewith to their normal positions.

A modification of the embodiment is illustrated in FIG. 2 wherein like numerals and letters refer to like parts in the preferred embodiment wherever possible.

In the power hydraulic system, the pressure relief valve of the pumping means 1 is omitted, and a pressure relief valve 57 is positioned in the conduit 9 across the steering valve 7. A conduit 58 connects the inlet and outlet conduits 4 and 6 of the servo motor 5 and is provided with a reverse flow valve 59 and a pressure relief valve 60 positioned therein.

The general arrangement of the servo motor 5 remains substantially the same except that an abutment 61 is provided on the left end of the rod 35 instead of the snap ring 43 carried by the rod 35 in the FIG. 1 embodiment. The operation of the servo motor 5, FIG. 2, also remains substantially the same except during a power failure application. When the operator applies a force to the actuating pedal 40 during a power failure, the force is transmitted, as previously described, motivating the rod 35 rightwardly. Due to the absence of pressure fluid flow through the channel 37, a pressure fluid differential resulting from throttling the passage D is not created to motivate the piston 30. Consequently, the abutment 61 engages and moves the piston 30 rightwardly. The right end of the piston 30 carries the washer 45 and the cup 46 into the bore 41 and outlet chamber C displacing pressure fluid therefrom through the brake port 49 and conduit 14 into the wheel cylinders 15 which actuate the brake assemblies. In this case, the reverse flow valve 59 is necessitated for the recirculation of the pressure fluid displaced from the chamber B by the piston 30. Upon the release of the applied force, the fluid pressure in the bore 41 and the actuating pedal spring returns the rod 35, the piston 30, and parts associated therewith to their normal positions.

This invention is intended to cover all changes and modifications of the example of the invention herein chosen for purposes of the disclosure, which do not constitute departures from the spirit and scope of the invention.

What we claim is:

1. A servo motor for an open center fluid pressure system having pumping means for continuously circulating pressure fluid through said system and said servo motor, said servo motor comprising a cylinder, inlet and outlet ports in said cylinder connected with the discharge and return sides, respectively, of said pumping means, a power piston slidable in said cylinder between said inlet and outlet ports, extension means on said power piston extending externally of said cylinder, said power piston having a bore and inlet and outlet passage means on opposite sides of said power piston providing fluid communication between said bore and said inlet and outlet ports, a throttling rod slidable in said bore, said throttling rod and power piston forming a throttling passage therebetween in communication with said inlet and outlet passage means in said power piston providing series pressure fluid flow from said inlet port to said outlet port, cooperable means on said throttling rod and power piston forming a normally unrestricted, but variable valving orifice in said throttling passage, said throttling rod being movable relative to said power piston in response to an applied force to reduce the size of the variable valving orifice for developing a fluid pressure differential across said power piston to actuate said power piston and extension means in follow-up relation with said throttling rod and to maintain said valving orifice in a non-closed condition for continuous circulation of pressure fluid therethrough.

2. The servo motor according to claim 1, wherein the opposing effective areas of each of said rod and power piston, respectively, in said cylinder are susbtantially equal and are acted on by ambient fluid pressure of the system.

3. The servo motor according to claim 2, wherein ambient fluid pressure is effective through said cylinder on the inlet and outlet port sides of said power piston and in said throttling passage and inlet and outlet passages, whereby the forces produced by the ambient fluid pressure of the system acting on the opposing effective areas of each of said throttling rod and power pistons are self-canceling.

4. The servo motor according to claim 4, including a pressure producing chamber coaxially disposed at one end of said chamber, and wherein said extension means includes a first extension with a working end positioned in said pressure producing chamber, a second extension on said power piston extending in an opposite direction from said first extension and having an end positioned out of said cylinder, said extensions being of the same diameter, and sealing means between said power piston and said cylinder and between said extensions and said cylinder.

5. The servo motor according to claim 4, wherein said throttling rod is slidable in said bore and has a first end in said pressure producing chamber and a second end positioned out of said cylinder, said power piston and throttling rod, respectively, having substantially equal opposed pressure responsive areas acted on by the ambient fluid pressure of said system, and the ends of said throttling rod and the ends of said first and second extensions, respectively, having substantially equal opposed effective areas normally acted on by atmospheric pressure out of said cylinder and in said chamber.

6. The servo motor according to claim 5, wherein piston means are provided in said pressure producing chamber in position to be actuated by the working end of said first extension, and lost motion connection means between said throttling rod and said piston means in said pressure producing chamber for actuation of the latter in response to an applied force on the throttling rod in the event of loss of pressure fluid circulation from said pumping means.

7. The servo motor according to claim 1, in which said servo motor includes means for effecting concert movement of said power piston and throttling rod in response to an applied force on the latter in the event of loss of pressure fluid circulation from said pumping means, and a normally closed check valve between said inlet and outlet ports, said check valve being opened by pressure fluid displaced from said cylinder through said outlet port upon the concert movement of said power piston and throttling rod to return the displaced pressure fluid to said cylinder through said inlet port.

8. An open center hydraulic circulating system comprising a pump, supply and return lines connected to said pump, and at least two servo motors in series flow relation between said supply and return lines, the operation of each of said servo motors creating back pressures in said supply line, one of said servo motors comprising a power cylinder and a pressure producing chamber, a slidable power piston dividing said cylinder to form an inlet chamber connected by said supply line to said pump and an outlet chamber connected to the other of said servo motors, said power piston having a working end positioned in said pressure producing chamber, the opposing effective areas of said power piston in communication with said inlet and outlet chambers being substantially equal to prevent movement of said power piston in response to the back pressure in said system imposed across said one servo motor by said other servo motor, said power piston having a bore and inlet and outlet passage means on opposite sides of said power piston providing fluid communication between said bore and said inlet and outlet chambers, a throttling rod slidable in said bore, said throttling rod and power piston forming a throttling passage therebetween in communication with said inlet and outlet passage means in said power piston providing series pressure fluid flow from said inlet port to said outlet port, cooperable means on said throttling rod and power piston forming a normally unrestricted, but variable valving orifice in said throttling passage, said throttling rod being movable relative to said power piston in response to an applied force to reduce the size of the variable valving orifice for developing a fluid pressure differential across said power piston to actuate said power piston and extension means in follow-up relation with said throttling rod and to maintain said valving orifice in a non-closed condition for continuous circulation of pressure fluid therethrough.

9. The system according to claim 8, wherein said power piston of said one servo motor includes a first extension having said working end positioned in said pressure producing chamber, a second extension on said power piston extending in an opposite direction from said first extension and having an end positioned out of said cylinder, the opposing effective areas of said extensions being substantially equal, and sealing means between said power piston and said cylinder and between said extensions and said cylinder.

10. The system according to claim 9, wherein said throttling rod of said one servo motor has a first end in said pressure producing chamber and a second end positioned out of said cylinder, said power piston and throttling rod, respectively, having substantially equal opposed pressure responsive areas acted on by the ambient fluid pressure of said system, and the ends of said throttling rod and the ends of said first and second extensions, respectively, having substantially equal opposed effective areas normally acted on by atmospheric pressure out of said cylinder and in said pressure producing chamber.

11. The system according to claim 8, wherein said one servo motor includes piston means provided in said pressure producing chamber in position to be actuated by the working end of said power piston, and lost motion connection means between said throttling rod and said piston means in said pressure producing chamber for actuation of the latter in response to an applied force on the throttling rod in the event of loss of pressure fluid circulation from said pumping means.

12. The system according to claim 8, in which said one servo motor includes means for effecting concert movement of said power piston and throttling rod in response to an applied force on the latter in the event of loss of pressure fluid circulation from said pumping means, and a normally closed check valve connected in parallel relation with said pumping means between said inlet and outlet ports, said check valve being opened by pressure fluid displaced from said cylinder through said outlet port upon the concert movement of said power piston and throttling rod to return the displaced pressure fluid to said cylinder through said inlet port.

13. The system according to claim 11, wherein said throttling rod is imperforate and has one end positioned in said pressure producing chamber, and retaining means carried by said one end of said throttling rod for engaging and returning said piston means to its normally inoperative position in said pressure producing chamber.

References Cited in the file of this patent

UNITED STATES PATENTS

| | | |
|---|---|---|
| 1,890,010 | Vickers | Dec. 6, 1932 |
| 1,960,996 | Guernsey | May 29, 1934 |
| 2,059,082 | Brady et al. | Oct. 27, 1936 |
| 2,517,005 | MacDuff | Aug. 1, 1950 |
| 2,624,361 | Brown | Jan. 6, 1953 |
| 2,844,941 | Ayers | July 29, 1958 |

UNITED STATES PATENT OFFICE
CERTIFICATE OF CORRECTION

Patent No. 3,050,944                                 August 28, 1962

Robert E. Schwartz et al.

It is hereby certified that error appears in the above numbered patent requiring correction and that the said Letters Patent should read as corrected below.

Column 2, line 60, for "have" read -- having --; column 3, line 69, for "Balacing" read -- Balancing --; column 6, line 36, for the claim reference numeral "4" read -- 1 --.

Signed and sealed this 22nd day of January 1963.

(SEAL)
Attest:

ERNEST W. SWIDER
Attesting Officer

DAVID L. LADD
Commissioner of Patents